3,068,109
MATERIAL AND METHOD FOR COLORING PORTLAND CEMENT CONCRETES
Elmer O. Rodeffer, 863 Lynnhaven Lane, La Canada, Calif.
No Drawing. Filed Aug. 20, 1956, Ser. No. 605,229
6 Claims. (Cl. 106—98)

This invention relates to a method for the integral coloring of Portland cement concretes and to an integral concrete coloring composition.

One object of the invention is to provide an economical method and means for coloring Portland cement concrete. Another object is to provide a method for the integral coloring of Portland cement concrete which gives uniform coloring throughout the mass. Another object is to provide means for coloring Portland cement concrete which simultaneously improves the mechanical and chemical properties of the hardened concrete.

I have discovered that Portland cement concrete may be integrally and decoratively colored by mixing with the usual plastic Portland cement-sand-aggregate-water mixture, a pozzolanic material premixed with relatively small quantities of suitable mineral pigments, and preferably also premixed with a small amount of a dispersing agent for dispersing the pozzolanic material and the mineral pigment in the concrete. I have found that the fine grinding and intimate mixture of the pozzolanic material, the pigment, and the dispersing agent in the proportions set forth hereinafter in detail produces a coloring agent which may be readily added to and intermixed with plastic concrete mixtures of the usual types to produce an improved concrete which is decoratively colored throughout the composition. My invention resides in the discovery that the coloring effect of mineral pigments is greatly enhanced by its use along with a pozzolan or pozzolanic material.

The decorative coloring of Portland cement concrete masses has heretofore been possible only by the addition of quite large proportions of mineral pigments, such as the various colored iron oxides and the like, the proportion required to produce desirable decorative colors in the hardened concrete being so large that prohibitively heavy additional costs were involved. For example, to produce a certain shade of brick red concrete in mass requires the addition of from 5 to 6 pounds of red iron oxide for each ninety-four pounds of the Portland cement in the mixture, whereas, when the proper proportion of pozzolanic material is also used, a much smaller proportion of red iron oxide is required. This large amount of iron oxide greatly increases the cost of the concrete, and the coloring is generally not uniform throughout the mass, and the physical properties of the concrete are somewhat lowered by the large addition of the mineral pigment. In some cases, particularly where floors or similar horizontal surfaces are involved, it has been the practice to provide a colored facing on the concrete mass by use of a prepared concentrated mixture of pigment and cement, working this onto the surface by the usual manipulative procedures. This, of course, produces only a surface ornamentation which has the disadvantages that it is expensive, that broken edges or corners show the gray color of the concrete mass, and surface repairs are difficult.

As examples of the compositions for concrete coloring agents which I have found satisfactory, a tan color is produced by the addition to the concrete of a mixture of 70 parts by weight of pozzolan, 5 parts by weight of brown iron oxide and 1.5 parts by weight of a dispersing agent for the pozzolan and the iron oxide. As another illustration of my coloring agent I have mixed together 70 parts by weight of pozzolan, 15 parts by weight of brown iron oxide and 1.5 parts by weight of a dispersing agent for the pozzolan and iron oxide to produce a coloring agent which gives an adobe coloration to the concrete mass.

The proportions of the coloring agent of my invention relative to the concrete may be varied to produce the intensity of coloring in the concrete which is desired, and this amount is closely related to the amount of Portland cement in the concrete mixture. I have found that the coloring agents as above illustrated give suitable coloring to the mass of concrete if the ratio of coloring agent to the Portland cement in said concrete mixture, on a weight basis, is in the range from 1:3 to 1:12.

It is necessary that the ratio of the pozzolan to most of the used mineral pigments be about 5:1 in order to produce the beneficial effect of the pozzolan as an intensifier for the coloring property of the pigment, although for some of the lighter tints such as tan and coral, the ratio may be as high as 15:1. The use of less pozzolan results in non-uniformity of color as well as the waste of the more expensive mineral pigment, and the use of a greater proportion of the pozzolan masks the color of the pigment, so that the maximum benefit is not attained. When a larger ratio of the coloring agent relative to the Portland cement in the concrete mixture is used than that specified above, the mechanical properties of the concrete are lowered by an excess of the pozzolan material.

The pozzolanic material used in the compositions of my invention includes those accepted by the trade as pozzolans in accordance with the definition of the American Society for Testing Materials (G219–53T) which reads "a siliceous or siliceous and aluminous material, which in itself possesses little or no cementitious value but will, in finely divided form and in the presence of moisture, chemically react with calcium hydroxide at ordinary temperatures to form compounds possessing cementitious properties." I have used finely ground calcined diatomaceous earth, fly ash, and the like and prefer the diatomaceous type pozzolan because of its opalene silica content.

The pigments which may be used in my coloring agent consist of the stable mineral oxides, either natural or synthetic, which are commonly used in the ceramic arts, including iron oxide and chromium oxide in various pigment forms.

The dispersing agent which I have found most satisfactory is a lignin derivative such as sodium lignosulfonate, although other well known dispersing agents for mineral pigments and pozzolans may be employed, such as calcium lignosulfonate and other lignosulfonate compounds.

It is important that the pozzolan and the pigment and the dispersing agent be inter-ground or very thoroughly mixed before adding the material to the concrete mixer. This may be accomplished by inter-grinding these ingredients or by very thoroughly blending them after they have been separately pulverized to the finest powders.

While I do not know the exact mechanism or chemical reaction which produces the coloring results above described, it is well known that there is a chemical reaction between the pozzolan materials and the calcium hydroxide which is produced or liberated during the hydration process of the Portland cement. It appears reasonable to assume that the finely divided coloring pigments are dispersed uniformly through this reaction product of the pozzolan and the calcium hydroxide of the cement, and effectively masks the basic gray color of the Portland cement itself and the color of the sand and aggregate, by being distributed as a coating over all of the surfaces thereof.

The advantages will be obvious from the above description. The simultaneous use of the pozzolan with the mineral pigment reduces the amount of the color material which is required for a given shade in the finished concrete mass. The uniform coloring of the entire concrete mass is obviously an advantage in producing decorative concrete structures.

I claim:

1. In the process for making an integral colored structure by placing previously prepared Portland cement concrete mix wherein there is a dispersed coloring agent, the method of integrally coloring said concrete structure whereby the coloring effect of said mineral coloring agent is greatly enhanced and made more uniform and whereby the said Portland cement concrete when hardened is improved in strength and in resistance to subsequent corrosion, which comprises mixing together with said Portland cement concrete mix a coloring agent consisting of a finely ground mineral pigment selected from the group consisting of iron oxide and chromium oxide and a pozzolan which pozzolan in the presence of water is reactive with the Portland cement of said concrete to form an aqueous reaction product in which said mineral coloring agent remains dispersed; placing said Portland cement concrete mix, pigment and pozzolan mixture, and allowing said mixture to harden forming an integrally colored concrete structure.

2. In the process for making an integral colored structure by placing previously prepared Portland cement concrete mix wherein there is a dispersed coloring agent, the method of integrally coloring said concrete structure whereby the coloring effect of said mineral coloring agent is greatly enhanced and made more uniform, and whereby the said Portland cement concrete when hardened is improved in strength and in resistance to subsequent corrosion, which comprises mixing together with said Portland cement concrete mix a coloring agent consisting of a finely ground mineral pigment selected from the group consisting of iron oxide and chromium oxide and a pozzolan which pozzolan in the presence of water is reactive with the Portland cement of said concrete to form an aqueous reaction product in which said mineral coloring agent remains dispersed, the weight ratio of said pigment to said pozzolan being not greater than about 1:5; placing said Portland cement concrete mix, pigment and pozzolan mixture; and allowing said mixture to harden, to form an integrally colored concrete structure.

3. In the process for making an integral colored structure by placing previously prepared Portland cement concrete mix wherein there is a dispersed colored agent, the method of integrally coloring said concrete structure whereby the coloring effect of said mineral coloring agent is greatly enhanced and made more uniform and whereby the said Portland cement concrete when hardened is improved in strength and in resistance to subsequence corrosion, which comprises mixing together with said Portland cement concrete mix a coloring agent consisting of a finely ground mineral pigment selected from the group consisting of iron oxide and chromium oxide, and a pozzolan which pozzolan in the presence of water is reactive with the Portland cement of said concrete to form an aqueous reaction product in which said mineral pigment remains dispersed, the weight ratio of said pigment to said pozzolan being not greater than about 1:5 and the weight ratio of said coloring agent to said Portland cement in said concrete mix being in the range from 1:3 to 1:12; placing said Portland cement concrete mix, pigment and pozzolan mixture; and allowing said mixture to harden to form an integrally colored concrete structure.

4. In the process for making an integral colored structure by placing previously prepared Portland cement concrete mix wherein there is a dispersed coloring agent, the method of integrally coloring said concrete structure whereby the coloring effect of said mineral coloring agent is greatly enhanced and made more uniform, and whereby the said Portland cement concrete when hardened is improved in strength and in resistance to subsequent corosion, which comprises mixing together with said Portland cement concrete mix a coloring agent consisting of a finely ground mineral pigment selected from the group consisting of iron oxide and chromium oxide, a pozzolan which pozzolan in the presence of water is reactive with the Portland cement of said concrete to form an aqueous reaction product in which said mineral coloring agent remains dispersed, and a dispersing agent for said pigment and said pozzolan; placing said Portland cement concrete mix, pigment, pozzolan and dispersing agent mixture, and allowing said mixture to harden to form an integrally colored concrete structure.

5. An integrally colored plastic concrete mixture consisting essentially of Portland cement, sand, aggregate, water and a coloring agent consisting essentially of a pozzolan and a mineral pigment selected from the group consisting of iron oxides and chromium oxide, said mineral pigment being uniformly dispersed throughout the aqueous reaction product of said pozzolan and the calcium hydroxide released by said cement in the presence of water, the weight ratio of said pigment to said pozzolan being not greater than about 1:5; and the weight ratio of said coloring agent to the Portland cement being in the range from 1:3 to 1:12.

6. An integrally colored plastic concrete mixture consisting essentially of Portland cement, sand, aggregate and water, a coloring agent consisting essentially of a pozzolan and a mineral pigment selected from the group consisting of iron oxides and chromium oxide, said mineral pigment being uniformly dispersed throughout the aqueous reaction product of said pozzolan and the calcium hydroxide released by said cement in the presence of water, and a dispersing agent for said pozzolan and said pigment, the weight ratio of said pigment to said pozzolan being not greater than about 1:5; and the weight ratio of said coloring agent to the Portland cement in said concrete mixture being in the range from 1:3 to 1:12.

References Cited in the file of this patent

UNITED STATES PATENTS

| 125,254 | Bandman | Apr. 2, 1872 |
| 672,240 | Saunders | Apr. 16, 1901 |
| 1,172,796 | Hereng | Feb. 22, 1916 |
| 1,453,457 | Haldeman | May 1, 1923 |
| 2,177,197 | Cummins | Oct. 24, 1939 |
| 2,250,107 | Nelles | July 22, 1941 |
| 2,313,107 | Wertz | Mar. 9, 1943 |
| 2,646,360 | Lea | July 21, 1953 |

FOREIGN PATENTS

| 1,582 | Great Britain | of 1860 |
| 4,451 | Great Britain | of 1890 |
| 25,715 | Great Britain | of 1905 |
| 284,295 | Great Britain | May 3, 1928 |
| 320,597 | Great Britain | Oct. 17, 1929 |